(12) United States Patent
Okuno et al.

(10) Patent No.: US 6,700,354 B2
(45) Date of Patent: Mar. 2, 2004

(54) VEHICLE AC GENERATOR

(75) Inventors: Tomoya Okuno, Nishio (JP); Toshinori Maruyama, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/176,525

(22) Filed: Jun. 24, 2002

(65) Prior Publication Data

US 2003/0015927 A1 Jan. 23, 2003

(30) Foreign Application Priority Data

Jul. 18, 2001 (JP) ......................... 2001-217686

(51) Int. Cl.⁷ .................. F16H 55/36; F16D 41/06

(52) U.S. Cl. .................. 322/29; 322/17; 310/68 B

(58) Field of Search .................. 322/40, 42, 17, 322/29, 99; 310/68 B, 68 R

(56) References Cited

U.S. PATENT DOCUMENTS

| | | | | |
|---|---|---|---|---|
| 3,786,336 A | * | 1/1974 | Lohr ........................... | 322/51 |
| 4,846,768 A | * | 7/1989 | Kitami et al. ................. | 474/86 |
| 5,575,366 A | * | 11/1996 | Zenmei et al. ................ | 192/45 |
| 6,201,310 B1 | * | 3/2001 | Adachi et al. ............... | 290/4 C |
| 6,237,736 B1 | * | 5/2001 | Ouchi ....................... | 192/41 R |
| 6,531,849 B2 | * | 3/2003 | Nakamura et al. ............ | 322/27 |

* cited by examiner

Primary Examiner—Burton Mullins
(74) Attorney, Agent, or Firm—Oliff & Berridge, PLC

(57) ABSTRACT

A vehicle AC generator includes a pulley unit having a one-way clutch, a rotor having a plurality of magnetic poles, a field coil, a stator having a stator winding, a cycle period detecting unit and a signal unit. The pulley unit transmits one-way driving torque to the rotor and interrupts the rotor from the other driving torque. The angular acceleration detecting unit detects angular acceleration of the rotor when the one-way clutch idles the pulley. The signal unit transmitting a signal that indicates the angular acceleration to an outside device.

7 Claims, 7 Drawing Sheets

VEHICLE AC GENERATOR

CROSS REFERENCE TO RELATED APPLICATION

The present application is based on and claims priority from Japanese Patent Application 2001-217686, filed Jul. 18, 2001, the contents of which are incorporated herein by reference.

BACKGROUND OF THE INVENTION

1. Field of the Invention

The present invention relates to a vehicle AC generator mounted in a vehicle, such as a passenger car or a truck.

2. Description of the Related Art

An AC generator is mounted in an automotive vehicle that is equipped with a gasoline engine or a diesel engine to generate electric power to be supplied to various electric loads and to be charged into a battery. The input torque of such an AC generator changes when some supply lines of the electric power are connected or interrupted or when engine angular acceleration changes. The input torque of the AC generator is usually calculated by an ECU (Electronic Control Unit) from duty ratio of current supplied to the field coil of the AC generator. However, it is difficult to accurately calculate the input torque only from the duty ratio because the input torque also changes with rotation conditions of the rotor of the AC generator.

SUMMARY OF THE INVENTION

The present invention has been made in view of the above problems.

It is a main object of the invention to provide a vehicle AC generator that can accurately calculate the input torque thereof.

According to a feature of the invention, a vehicle AC generator includes a pulley unit, a rotor, a field coil, a stator, a rate-of-change detecting unit and a signal unit.

The pulley unit has a one-way clutch that transmits driving torque of an engine in one-direction and interrupts the driving torque of the engine in the other direction. The rotor is connected to the pulley unit and has a plurality of magnetic poles. The field coil polarizes the magnetic poles when field current is supplied at a certain duty ratio. The stator has a stator winding that generates AC voltage when the rotor rotates and provide a rotating magnetic field. The rate-of-change detecting unit detects angular acceleration of the rotor when one-way clutch interrupts driving torque and the pulley rotates idle. The signal unit transmits a signal that indicates the rate-of-change of the rotation speed or angular acceleration to an outside device. The input torque of the vehicle AC generator is proportional to the rate-of-change of the rotation speed of the rotor. Therefore, the outside device that receives the signal indicating the angular acceleration can calculate the input torque accurately.

It is desirable that the angular acceleration detecting unit calculates a speed of the rotor from the AC voltage generated by the stator winding. Since the wave shape of the AC voltage generated in the stator winding synchronizes with the rotation of the rotor, the rotation speed of the rotor can be detected by measuring the AC voltage.

Preferably, the angular acceleration detecting unit judges whether the pulley idles or not by detecting speed reduction ratios of the rotor, whereby the idling rotation of the pulley can be detected without a special sensor.

The angular acceleration detecting unit may also judge whether the pulley idles or not by detecting increase in cycle period of the AC voltage generated by the stator winding.

The signal unit preferably includes a two-way signal transmitting unit for receiving control signals from an outside device and transmits signals indicating the rotation speed angular acceleration to the outside device.

The vehicle AC generator may include a torque calculation unit for calculating a product of a moment of inertia and the angular acceleration. In this case, the signal unit transmits a signal indicating the product of a moment of inertia and the angular acceleration to the outside unit.

The vehicle AC generator may includes means for detecting a duty ratio of the field current. In this case, the signal unit transmits a signal indicating the duty ratio instead of the signal indicating the angular acceleration when the duty ratio is larger than a predetermined value.

According to another feature of the invention, a vehicle AC generator includes a pulley unit, a rotor, a field coil, a stator, a cycle period detecting circuit and a signal unit.

The pulley unit has a one-way clutch that transmits one-way driving torque and interrupts the other driving torque. The rotor is connected to the pulley unit and has a plurality of magnetic poles. The field coil polarizes the magnetic poles when field current is supplied at a duty ratio. The stator has a stator winding for generating AC voltage when the rotor rotates to provide a rotating magnetic field. The cycle period detecting unit outputs a signal indicating a difference between a current cycle period of the AC voltage generated by the stator winding and a precedent cycle period generated a predetermined time before the current cycle period when the current cycle period is larger than the precedent cycle period. The signal unit transmits the signal indicating the difference to an outside device. Preferably, the signal unit includes a two-way signal transmitting unit for receiving control signals from an outside device and transmits signals indicating the difference to the outside device.

It is also preferable for the vehicle AC generator to include means for detecting a duty ratio of the field current. When the duty ratio is larger than a predetermined value, the pulley does not rotate idle. Accordingly, the signal unit transmits a signal indicating that the torque calculation is to be stopped to an outside control device.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENT

A vehicle AC generator according to a preferred embodiment of the invention is described with reference to the appended drawings.

Figure 1:
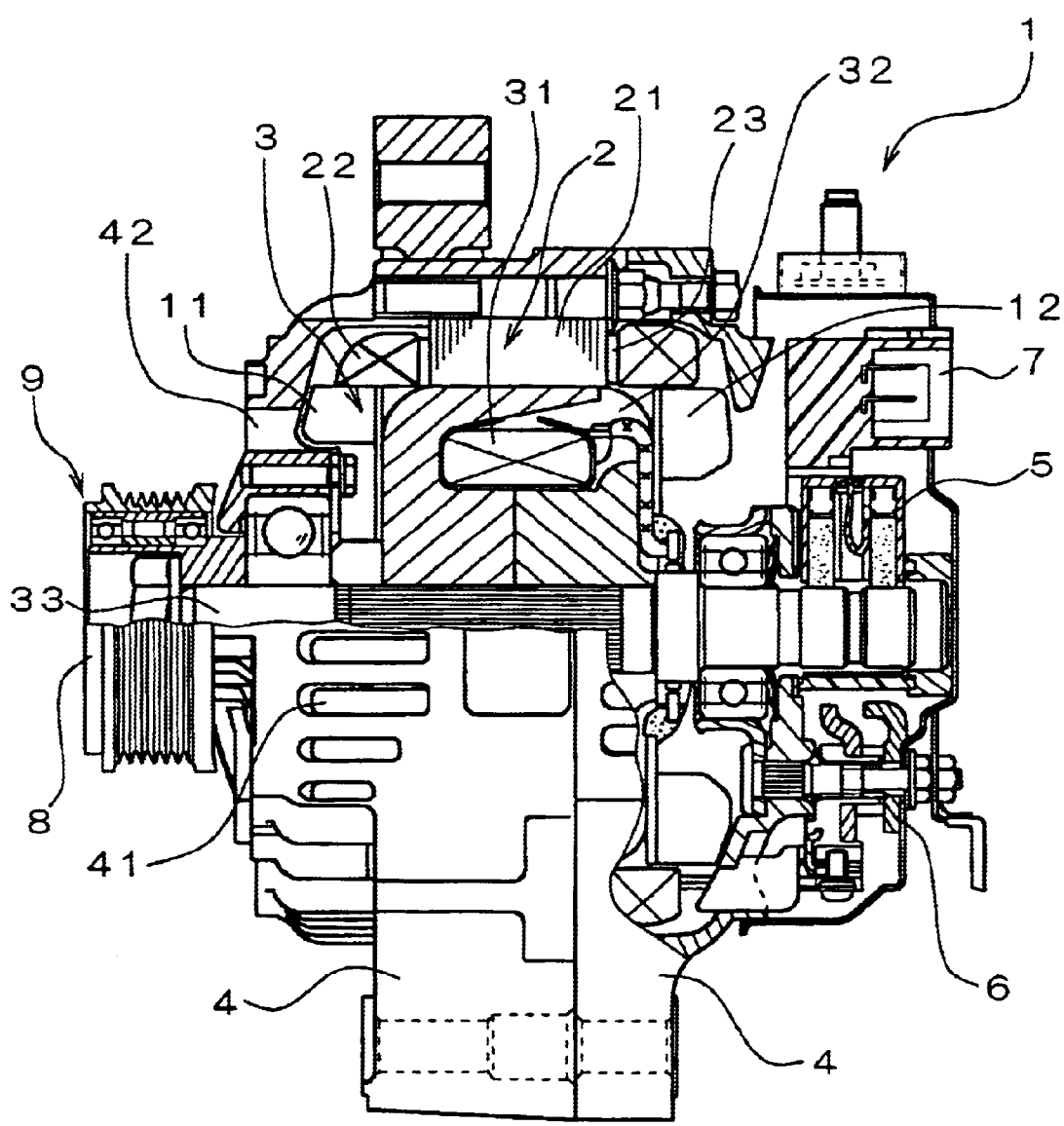
FIG. 1 is a partially cross-sectional side view of a vehicle AC generator according to a preferred embodiment of the invention.

As shown in FIG. 1, a vehicle AC generator 1 includes a stator 2, a rotor 3, a frame 4, a brush unit 5, a rectifier 6, a voltage regulator 7, a pulley unit 8, etc.

The stator 2 is comprised of a stator core 21, a three-phase stator winding 22 and insulators 23 that insulate the stator winding 22 from the stator core 21. The stator core 21 is a cylindrical laminate of a plurality of steel sheets that has a plurality of slots for accommodating the stator winding 22 at the inner periphery thereof. The rotor 3 is comprised of a cylindrically wound field coil 31, a pair of pole cores 32 each having six claw poles and a shaft 33 that penetrates the pole cores 32. The pair of pole cores 32 sandwiches and encloses the field coil 31 therein by the claw poles. The claw poles provide a magnetic field. An axial flow cooling fan 11 is welded to the front end of the pole core 32, and a centrifugal cooling fan 12 is welded to the rear end of the pole core 32. The frame 4 accommodates the stator 2 and the rotor 3 therein so that the rotor can rotates about the shaft 33 within the stator 2. The frame 4 has air discharge windows 41 at portions thereof opposite the stator winding 22 and air intake windows 42 at axial end portions thereof.

The rectifier unit 6 is a three-phase full-wave rectifier circuit that rectifies AC power outputted by the three-phase stator winding 22. The voltage regulator 7 controls the field current supplied to the field coil 31. When the electric load of the AC generator 1 is small and the output voltage of the stator winding 2 is higher than a predetermined voltage, the field current is intermittently supplied to reduce the field current. The voltage regulator 7 includes an angular acceleration detecting circuit 70 that generates a signal indicating variables of state that is necessary to calculate the input torque of the vehicle AC generator 1. The pulley unit 8 includes a one-way clutch that transmits driving torque only in one rotating direction.

Figure 2:
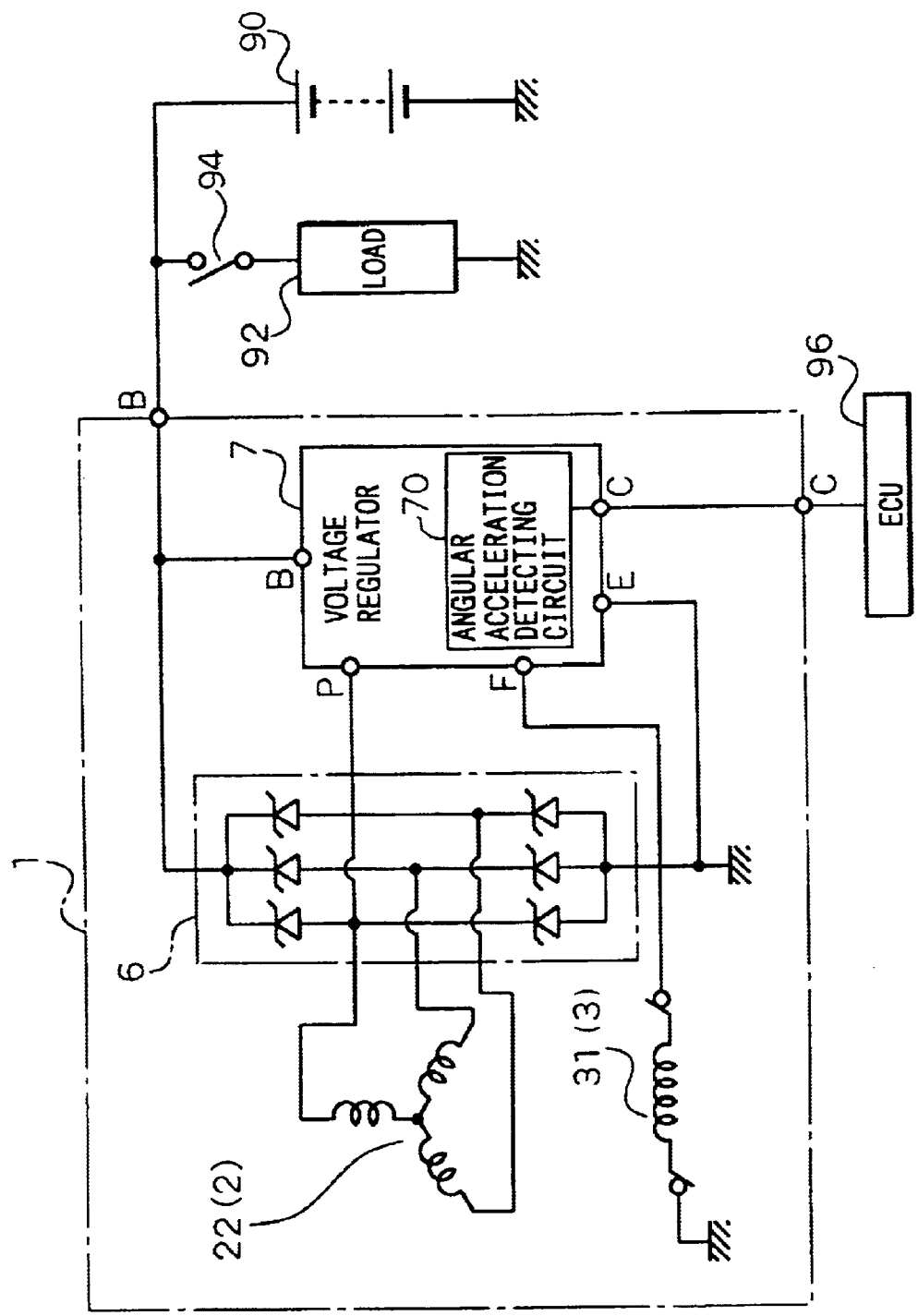
FIG. 2 is a connection diagram of an electric power supply system including the vehicle AC generator shown in FIG. 1.

The field coil 31 is mounted in the rotor 3 to provide a rotating magnetic field. The stator winding 22 is mounted in the stator core 21 that is disposed opposite the rotor at an air gap to generate AC voltage which is proportional to an amount of the rotating magnetic field. As shown in FIG. 2, the output voltage is rectified by the rectifier 6 that is a three-phase full-wave rectifier circuit. The output power of the rectifier 6 is supplied to a battery 90 via an output terminal B of the vehicle AC generator 1 and charged into the battery 90. The output power of the rectifier 6 is also supplied to an electric load 92, such as a lamp, through a load connecting switch 94.

The voltage regulator 7 is connected to a electronic control unit (hereinafter referred to the ECU) 96 via a signal interchanging terminal C so that signals can be interchanged between the voltage regulator 7 and the ECU 96. For example, a variable of state of the vehicle AC generator 1 is sent from the voltage regulator 7 to the ECU 96, and a variable of controlling the vehicle AC generator 1 is sent from the ECU 96 to the voltage regulator 7. The regulator 7 and the ECU 96 is connected by a direct signal wire or a communication bus.

Figure 3:
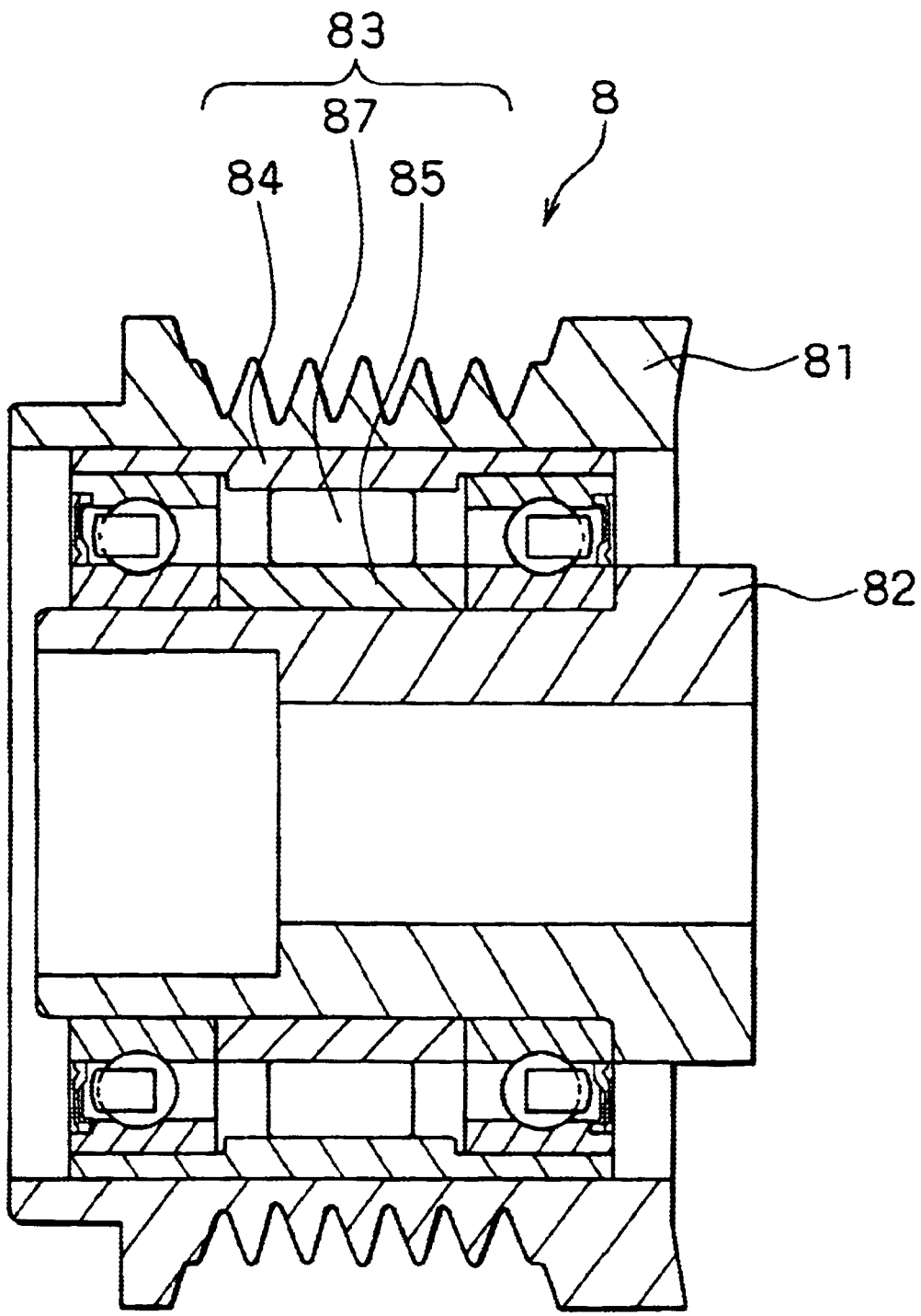
FIG. 3 is an enlarged cross-sectional side view of a pulley unit of the vehicle AC generator shown in FIG. 1.
Figure 4:
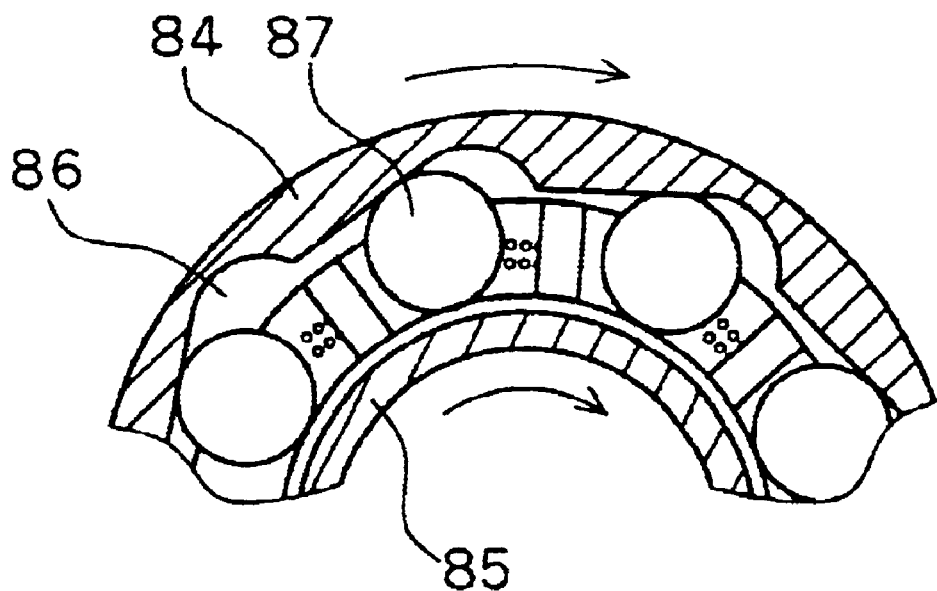
FIG. 4 is a schematic diagram illustrating operation of the pulley unit.
Figure 5:
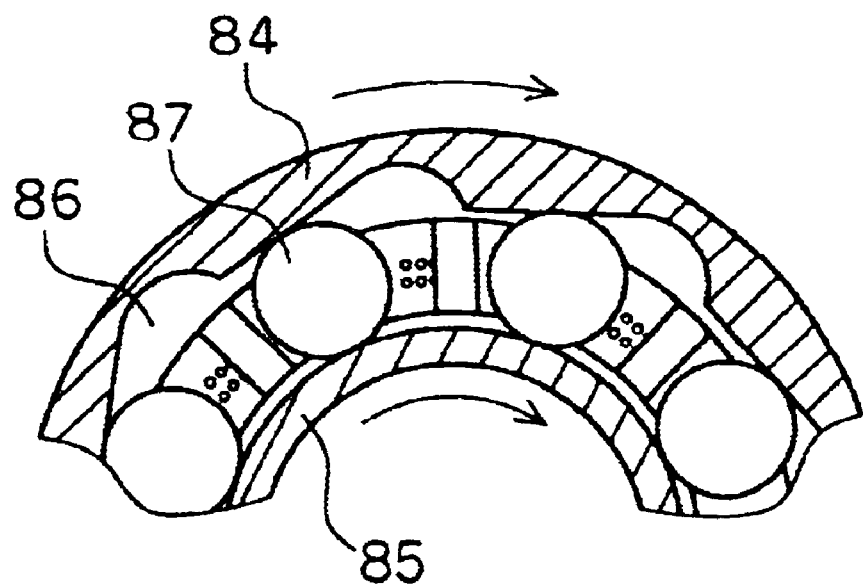
FIG. 5 is a schematic diagram illustrating operation of the pulley unit.

As shown in FIGS. 3–5, the pulley unit 8 is comprised of a pulley 81, a pulley shaft 82 and a one-way clutch 83. The one-way clutch 83 is comprised of an outer ring 84 that is fitted to the pulley 81, an inner ring 85 that is fitted to the pulley shaft 82 and a plurality of rollers 87 that is accommodated in a gradually narrowing compartment (wedge-like space) 86. The pulley shaft 82 is fixed to the shaft 33 of the rotor 3.

While the rotor 3 is rotating at a constant rotation speed, the outer ring 84 and the inner ring 85 are locked up by the rollers 87 that are in engagement with the wedge-like space so that the rotor 3 and the pulley 81 can rotate together (i.e. clutch-on state), as shown in FIG. 5. At this clutch-on state, the driving torque that is transmitted from the engine via a belt to the pulley 81 is transmitted to the pulley shaft 82 and the rotor 3 via the one-way clutch 83.

On the other hand, when the angular speed of the pulley 81 sharply reduces due to abrupt change in the engine rotation, the rollers 87 moves to the widening direction in the wedge-like space 86 and are disengaged from the wedge-like space 86 so that the outer ring 84 and the inner ring 85 can be freed. Therefore, the rotor 3 rotates at higher speed than the pulley 81 (i.e. clutch-off state), as shown in FIG. 4.

Figure 6:
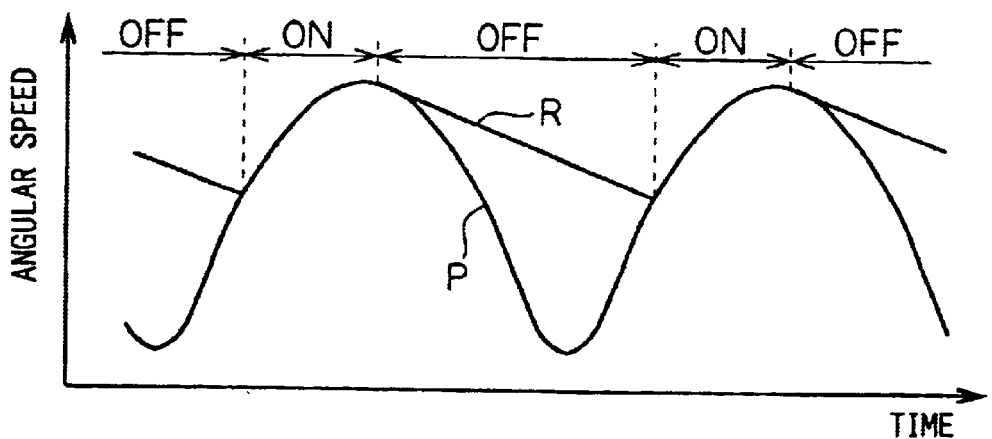
FIG. 6 is a graph showing operation of the pulley unit.

As shown in FIG. 6, when the clutch is in the clutch-off state, the rotation speed of the rotor 3 gradually lowers due to the input torque of the vehicle AC generator 1 and friction between the inner ring 85 and the pulley 81. If the input torque of the vehicle AC generator 1 is constant and the friction force is proportional to the relative speed of the pulley 81 to the rotor 3, the clutch-off state is caused when the angular acceleration of the pulley 81 at the clutch-on state is smaller than the angular acceleration of rotor 3 being decelerated only by the input torque of the vehicle AC generator 1 at the clutch-off state. When the clutch-off state is caused, statical friction is generated between the inner ring 85 and the pulley 81. However, this statical friction is negligibly smaller than the input torque of the vehicle AC generator 1. On the other hand, the clutch-on state is caused when the angular speed of the rotor 3 that rotates under the clutch-off state is equal to the angular speed of the pulley 81. The above condition is expressed as follows.

[E1]

Clutch-On State:

$$(Jp+Jr)\cdot\ddot{\theta}p = Tbelt - Talt$$

Clutch-Off State:

$$Jp\cdot\ddot{\theta}p = Tbelt + Tfr$$

$$Jr\cdot\ddot{\theta}r = -(Talt + Tfr) \qquad (1)$$

$$Tfr = \partial\cdot(\dot{\theta}r - \dot{\theta}p),$$

where

Jp: moment of inertia of the pulley (kgm$^2$),

Jr: moment of inertia of the rotor (kgm$^2$),

Tbelt: driving torque of the belt (Nm),

Tfr: friction torque between the pulley and the rotor (Nm),

Talt: input torque of the alternator (Nm), $\dot{\theta}$p: angular speed of the pulley (rad/sec), $\dot{\theta}$r: angular speed of the rotor (rad/sec), $\dot{\theta}p$: angular acceleration of the pulley (rad/sec²), $\dot{\theta}r$: angular acceleration of the rotor (rad/sec²), $\partial$: coefficient of the friction torque between the pulley and the rotor (Nm/(rad/sec)).

Because Tfr is negligibly smaller than Talt in the expression (1), it can be expressed as follows.

[E2]

$$Talt = -Jr \cdot \dot{\theta}r$$

Thus, if the angular acceleration of the rotor 3 can be measured, the input torque of the vehicle AC generator 1 can be directly calculated.

Figure 7:
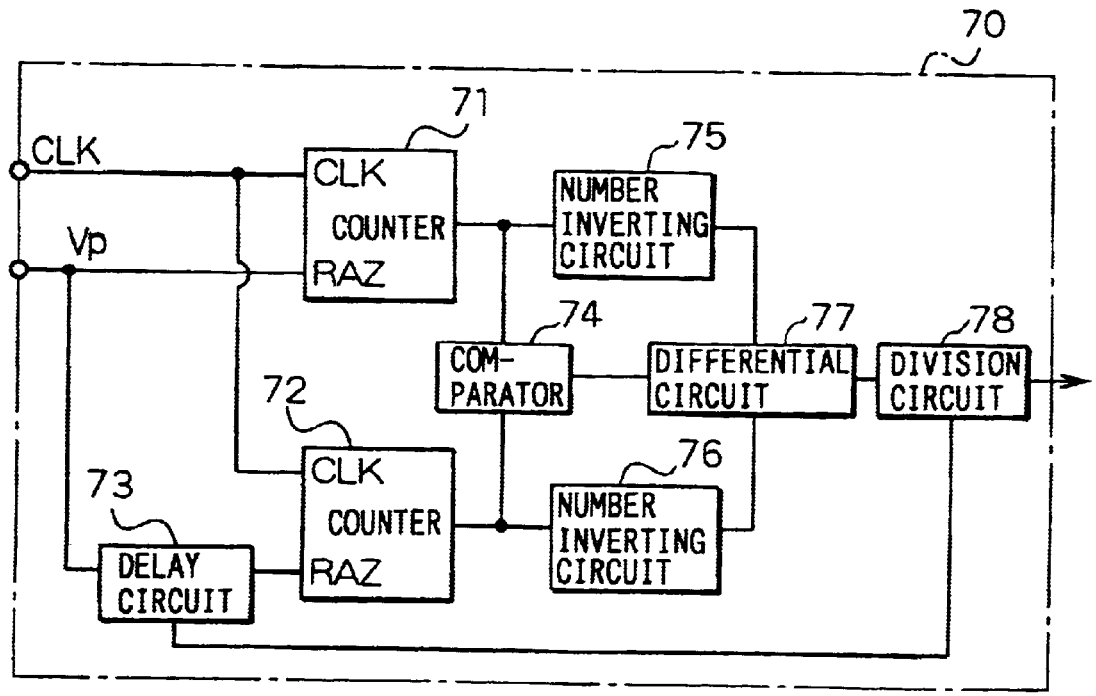
FIG. 7 is a block diagram of a angular acceleration detecting circuit of a voltage regulator of the vehicle AC generator shown in FIG. 1.

As shown in FIG. 7, the angular acceleration detecting circuit 70 is comprised of counters 71, 72, a delay circuit 73, a comparator 74, number-inverting circuits 75, 76, a differential circuit 77 and a division circuit 78.

A clock signal CLK and a phase voltage signal Vp of the stator winding 22 are applied to each of the counters 71, 72 to detect the cycle period of the phase voltage or the rotation cycle of the rotor 3. The delay circuit 73 is connected to an input terminal of the counter 72. When the phase voltage Vp is applied to the angular acceleration detecting circuit 70, it is applied to the counter 72 via the delay circuit 73, while it is directly applied to the other counter 71. When the output signal of the counter 71 indicates a current cycle period of the rotor, the output signal of the counter 72 indicates a cycle period of the rotor that is detected a certain time before the current cycle period is detected. Therefore, rotation change of the rotor can be calculated from these two cycle periods.

If the one-way clutch 83 is in the clutch-off state, the input torque of the vehicle Ac generator 1 is proportional to the angular acceleration of the rotor 3. That is, the input torque of the vehicle AC generator 1 can be calculated from the angular acceleration.

When the one-way clutch 83 is in the clutch-off state, the rotation speed of the rotor 3 lowers, as shown in FIG. 6. The comparator 74 compares respective output signals of the counters 71, 72 and provides the differential circuit 77 with a clutch-off signal if the output signal of the counter 72 is larger than the output signal of the other counter 71. In other words, if the pulley 81 rotates idle and the rotor 3 slows down, the clutch-off signal is sent from the comparator 74 to the differential circuit 77.

The output signal of the counter 71 is inputted to the number-inverting circuit 75, so that the rotation cycle of the rotor 3 detected by the counter 71 is converted to the angular speed. The output signal of the counter 72 is also inputted to the number-inverting circuit 76, so that the rotation cycle of the rotor 3 detected by the counter 72 is converted to the angular speed. These angular speeds are inputted into the differential circuit 77, which calculates a difference between these two values. The division circuit 78 divides the difference by the delay time of the delay circuit 73 to provide an angular acceleration that is a rate of the angular speed change in a unit time. Because the angular acceleration is proportional to the input torque, the acceleration rate is sent from the voltage regulator 7 to the ECU 96 to calculate the input torque.

Since the angular acceleration of the rotor is detected while the pulley unit 8 is in the clutch-off state, it is suitable to detect the input torque of the vehicle AC generator 1 when generating comparatively small output power.

Figure 8:
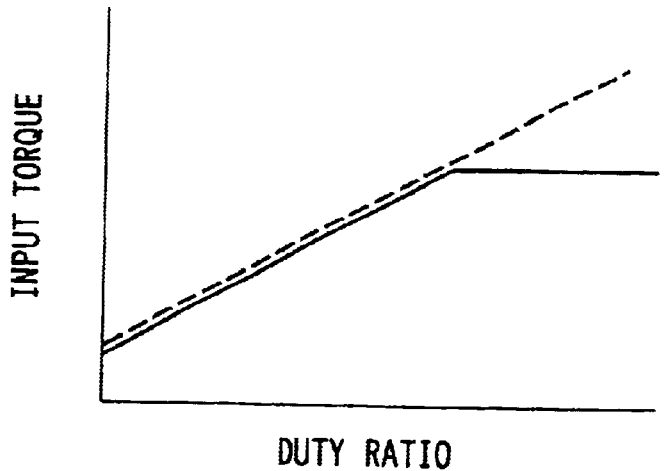
FIG. 8 is a graph showing a difference between a practical input torque curve and calculated torque curve.

When the duty ratio of the field current supplied to the field coil 31 becomes larger than a certain value, the pulley 81 does not rotate idle. Therefore, the torque (indicated by a solid line) that is calculated from the angular acceleration of the rotor 3 does not correspond to the actual input torque (indicated by a dotted line in FIG. 8) of the vehicle AC generator 1.

Figure 9:
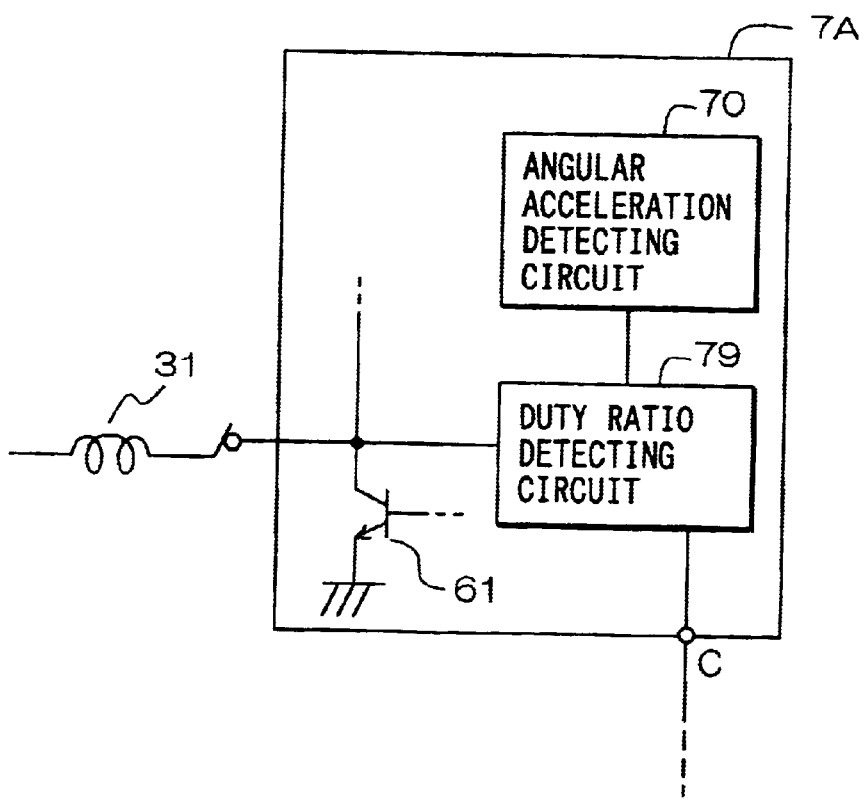
FIG. 9 is a schematic block diagram of a modified voltage regulator.

A modified voltage regulator 7A is described with reference to FIG. 9. The modified voltage regulator 7A includes a duty ratio judging circuit 79 that is connected to the output terminal of the angular acceleration detecting circuit 70. The duty ratio judging circuit 79 watches operation of a switching element 61 that intermittently supplies the field current to the field coil 31 and judges if the duty ratio is larger than a predetermined value or not.

If the duty ratio is smaller than a predetermined value, the calculated angular acceleration that is outputted from the angular acceleration detection circuit 70 is directly sent from the signal interchanging terminal C of the voltage regulator 7A to the ECU 96. On the other hand, if the duty ratio is larger than the predetermined value, the duty ratio judging circuit 79 sends a calculation stop signal from the signal interchanging terminal C to the ECU 96 instead of the calculated angular acceleration. When the ECU 96 receives the calculation stop signal, it stops calculation of the input torque.

Figure 10:
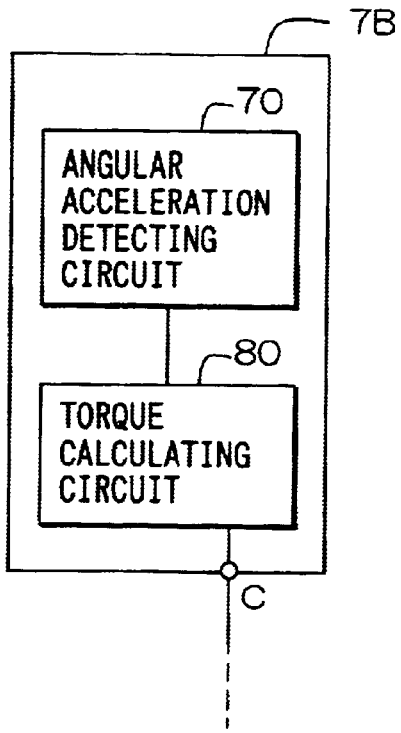
FIG. 10 is a schematic block diagram of another modified voltage regulator.

A modified voltage regulator 7B includes a torque calculating circuit 80 for providing a calculated input torque by multiplying the annular acceleration and a moment of the inertia of the rotor 3. As shown in FIG. 10, the torque calculating circuit 80 is connected to the output terminal of the angular acceleration detecting circuit 70. The output signal of the torque calculation circuit 80 is sent to the ECU 96.

The angular acceleration detecting circuit 70 can be substituted by a cycle detecting circuit 170 that detects a difference in the rotation cycle between consecutive two points of time.

Figure 11:
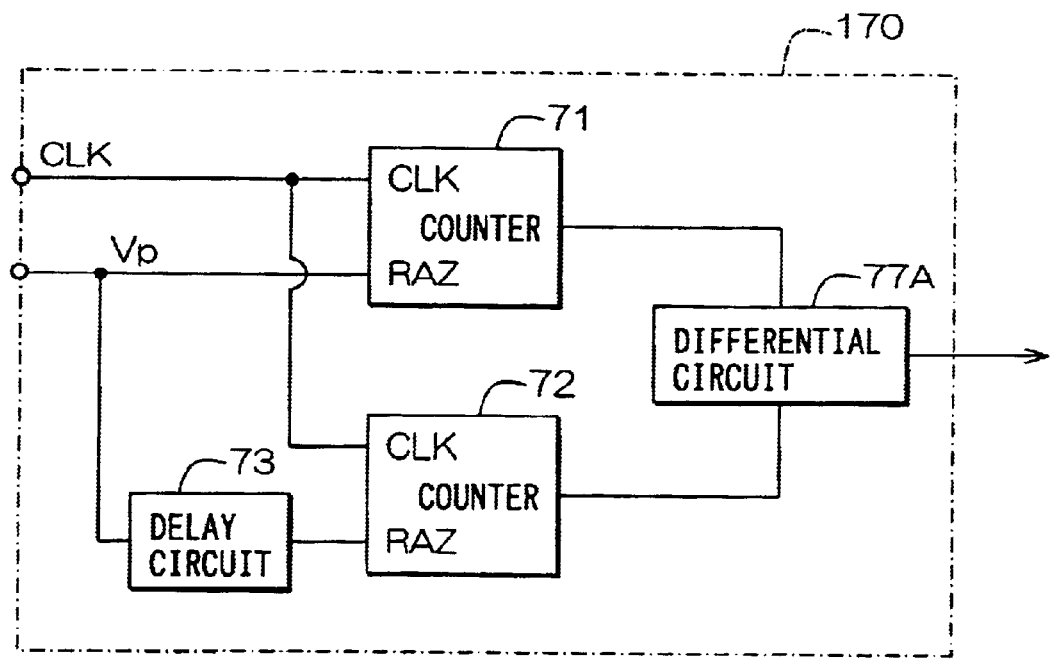
FIG. 11 is a block diagram of a cycle detecting circuit.

As shown in FIG. 11, the cycle detecting circuit 170 includes counters 71, 72, a delay circuit 73 and a differential circuit 77A. Here, the same reference numeral as that presented in FIG. 7 corresponds to the same component shown in FIG. 7. The differential circuit 77A subtracts the output value of the counter 71, which is the cycle period of the rotor 3 detected at a certain time later, from the output value of the counter 72 that is the current cycle period. If the result of the subtraction is negative, it is indicated that the rotor 3 is being decelerated, or that the pulley 81 is rotating idle. Consequently, the result is sent to the ECU 96 from the signal interchanging terminal C.

Because the wave shape of the AC voltage induced in the stator winding 22 changes in synchronism with the rotation of the rotor 3, the ECU 96 can calculate the input torque from the angular acceleration that is calculated from the difference in the AC voltages between two points of time.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A vehicle AC generator comprising:
   a pulley unit having a one-way clutch that transmits one-way driving torque;
   a rotor connected to said pulley wilt and having a plurality of magnetic poles;
   a field coil for polarizing said magnetic poles when field current is supplied at a duty ratio;

a stator having a stator winding for generating AC voltage when said rotor rotates to provide a rotating magnetic field;

an angular acceleration detecting unit for detecting angular acceleration of said rotor when said one-way clutch interrupts driving torque to idle said pulley; and a signal unit for transmitting a signal that indicates said angular acceleration to an outside device.

2. The vehicle AC generator as claimed in claim 1, wherein said angular acceleration detecting unit calculates a speed of said rotor from said AC voltage generated by said stator winding.

3. The vehicle AC generator as claimed in claim 1, wherein said angular acceleration detecting unit judges whether said pulley is idling or not by detecting speed reduction ratios of said rotor.

4. The vehicle AC generator as claimed in claim 1, wherein said angular acceleration detecting unit judges whether said pulley is idling or not by detecting increase in cycle period of said AC voltage generated by said stator winding.

5. The vehicle AC generator as claimed in claim 1, wherein said signal unit comprises a two-way signal transmitting unit for receiving control signals from an outside device and transmits signals indicating said angular acceleration to said outside device.

6. The vehicle AC generator as claimed in claim 5, further comprising a torque calculation unit for calculating a product of a moment of inertia and said angular acceleration, wherein said signal unit transmits a signal indicating said product of a moment of inertia and sad angular acceleration to said outside unit.

7. The vehicle AC generator as claimed in claim 1, further comprising means for detecting a duty ratio of said field current, wherein said signal unit transmits a control signal instead of said signal that indicates said angular acceleration when said duty ratio is larger than a predetermined value.

* * * * *